United States Patent
Jean et al.

(10) Patent No.: US 8,869,043 B2
(45) Date of Patent: Oct. 21, 2014

(54) SYSTEM FOR PRESENTING APPLICATIONS ON INSTANT MESSAGING CLIENTS

(75) Inventors: Yves D. Jean, New York, NY (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 1977 days.

(21) Appl. No.: 10/862,726

(22) Filed: Jun. 7, 2004

(65) Prior Publication Data

US 2005/0273496 A1    Dec. 8, 2005

(51) Int. Cl.
*G06F 3/00* (2006.01)
*H04L 12/58* (2006.01)
*H04L 12/24* (2006.01)
*H04L 29/08* (2006.01)

(52) U.S. Cl.
CPC .......... *H04L 12/581* (2013.01); *H04L 51/046* (2013.01); *H04L 41/22* (2013.01); *H04L 51/04* (2013.01); *H04L 67/16* (2013.01); *H04L 67/125* (2013.01)
USPC ............................ 715/753; 709/202; 709/206

(58) Field of Classification Search
CPC ...................................................... H04L 51/046
USPC ................... 715/753; 709/202, 206
See application file for complete search history.

(56) References Cited

U.S. PATENT DOCUMENTS

| 7,356,565 B2 * | 4/2008 | Zimmermann et al. ....... 709/206 |
| 2003/0079024 A1 * | 4/2003 | Hough et al. ................. 709/227 |

OTHER PUBLICATIONS

Joe Levine, Ten Minute Guide to Groove(r) 2.0, Jun. 20, 2002, Que, pp. 1-21.*
Sean Fullertone et al., Using Microsoft Active Directory, Que.*
Levine, Ten Minute Guide to Groove(r) 2.0, Que, Copyright (c) 2002, pp. 1-3.*
Zunk, Amy R. Hardware Review, Logitech QuickCam Pro 4000, Apr. 30, 2003 pp. 1-7; http://www.geek.com/hwswrev/hardware/logicam/index.htm.*

* cited by examiner

*Primary Examiner* — Andrey Belousov
(74) *Attorney, Agent, or Firm* — Muncy, Geissler, Olds & Lowe, P.C.

(57) ABSTRACT

The present invention is a system for accessing applications from even the most basic Instant Message (IM) enabled mobile device. The system utilizes the IM infrastructure of a mobile device to deliver application interfaces and manage the user experience. The invention is particularly applicable to applications with graphical user interfaces (GUI), even typical desktop or web applications. The system performs a direct transformation of application user interfaces into an IM messaging model with minimal functional distortions. The users own application knowledge and experience is leveraged, reducing application customization in the system architecture. The system also incorporates presence-driven mechanisms in the architecture.

31 Claims, 5 Drawing Sheets

SYSTEM FOR PRESENTING APPLICATIONS ON INSTANT MESSAGING CLIENTS

FIELD OF THE INVENTION

The present invention is a system for accessing applications from even the most basic Instant Message (IM) enabled mobile device. The system utilizes the IM infrastructure of a mobile device to deliver application interfaces and manage the user experience.

BACKGROUND OF THE INVENTION

The growth of wireless technologies has produced a range of choices for mobile connectivity. This growth has been one enabler in the expansion of personal mobile devices such as advanced mobile phones, personal digital assistants (PDAs), and other diminutive devices. The plethora of devices and connectivity options has created an opportunity for new communication ideas and services. Even existing resources can be better utilized by exploiting the new wireless technology, middleware, and protocols. The increase in connectivity options has allowed users to keep their "always-on" devices always on their person. It appears that this trend will shift the concept of "personal computing" from desktop personal computers (PCs), and laptops, to mobile devices.

Concurrent with this wireless technologies growth has been the growth of instant messaging (IM). IM is a popular communication application that began on the desktop and quickly migrated to mobile devices, helped along by the ease in porting the small footprint client. The popularity of IM is due to its simplicity, wide usage, and quick response. Users are able to hold simultaneous disjoint text-based exchanges with multiple users or contacts. IM systems create a fluid communication environment that encourages many exchanges with multiple contacts by publishing their presence or availability. When a contact starts using their IM client, and thus available for receiving messages, the IM system notifies all other users interested in the contact. Users now aware of the presence of the contact simply send messages to the contact's IM identity. So the IM system not only manages the messages between users, it takes care of detecting and notifying users of each other's availability or presence.

IM clients can be found on mobile phones, wireless PDAs, pager devices, etc. Furthermore, IM enjoys healthy attention from service providers such as AOL (America Online) and MSN (Microsoft Network) as well as the open standards community like the JABBER organization. This results in a constant expansion of the IM paradigm and the underlying technology (for example, secure and enterprise versions). Early IM systems consisted of buddy lists (presence notification), chat (text messages), and chat rooms. More recent developments include file and media exchange, as well as streaming media.

The popularity of IM makes it a natural interface for communication applications. For example, presence-based voice calls are notable because they drop the dialing step, reducing the uncertainty of connecting with the party of interest. IM has also been used to add communication features to existing applications by associating an IM channel with application usage. Network gaming is one example of adding a separate or an integrated IM communication channel to enhance the dynamics of group play. Work-related collaboration is another natural progression for IM use, both in the session staging as well as the interaction phase.

The present invention extends IM beyond communications and into the general application space. There exist prior art systems that have put application interfaces on IM clients. Typically such systems provide a messaging server that interfaces to an application server using a server-side natural language processor to replace the elements of the application's interface. These systems translate phrases and abbreviated text into the appropriate query and command statements. The inclusion of a natural language interface creates an added layer of application abstraction requiring the user to learn a new model for using an application. The burden on the user grows with the number of applications added to the system. These systems are well suited for query-like application interfaces (i.e. Structured Query Language, SQL) for use with an online helpdesk or in information queries. Additional prior art systems include an "application buddy" that uses presence information and search algorithms to deliver general message alerts to a user.

In addition, prior art remote desktop systems exist that deliver the full desktop interface to networked devices. For example, Microsoft Corporation's Remote Desktop Protocol is a protocol for transporting mouse, keyboard, and display rendering information for Windows-based applications. It demands high bandwidth to a client that may have a smaller footprint but is physically a PC. This system is suited for locally networked PCs running Microsoft technology. Any deviation from this configuration introduces latency and detracts from the user interface experience. The number of devices and services that support the system also limits usage.

Many mobile application delivery systems are designed to deliver content to different devices, making the necessary content conversion or protocol translation. Standards, such as J2ME (Sun Microsystems, Java 2 Enterprise Edition), provide support for writing mobile device independent applications, including the user interface. There exist prior art proprietary systems that provide coverage for many devices that may be used to access resources. The breadth of support requires a complex infrastructure and maintenance. As mobile communications and devices continue to expand in the number of protocols and devices, these systems must incorporate the changes and resolve any conflicts and inconsistencies. By attempting to deliver device and technology independence they assume the burden of integrating new technologies and requirements while maintaining performance expectations.

There exists a need in the prior art to extend IM beyond communications, that is, to utilize it as an application interface. Moreover, this interface should provide a universal interface to represent disparate applications on unmodified IM clients. The present invention addresses these needs by providing an instant messaging user interface. This aspect of the invention is referenced herein as IMUI. IMUI leverages existing infrastructure, devices, client interfaces, and applications to provide ubiquitous access to computing services.

SUMMARY OF THE INVENTION

The present invention uses IM as a universal user interface. In particular, IM is extended beyond communications to provide control for remote applications. The means for using and controlling applications is known as a user interface. The user interface for an IM client is typically crude (in contrast to the Web), however, the present invention transforms that interface and combines it with an applications server to attain an application interface that leverages IM.

The invention uses the IM infrastructure to connect a user to an application's interface. This is accomplished no matter what type of device is being used. The invention maps user messages directly to an application's collection of commands. The list of IM buddies is actually a list of the menu items for an application or a group of applications. By constantly updating the Buddy List based on user behavior, the user can trigger the applications to perform desired operations. Unlike prior art systems that rely on a query system and resulting required customization, the present invention manages the display of an application's interfaces as IM buddies on the user's device. In this way the present invention maps presence and availability to functionality. By actively managing the availability of application interfaces for the user, and conveying the user's availability to applications, the invention enables a new presence-based dynamic to applications.

A further embodiment of the invention transforms IM into an interface of generality approaching graphical user interfaces (GUI). To simplify the use of GUI's, the underlying software architecture separates GUI management from the application code. Essentially, by having a message exchange between the GUI window management code and the application, two separate processes could be run to perform an application. Thus, in a typical GUI application interface the GUI menu items are encoded into messages sent to the application code when the user makes a selection. The application code knows the full palette of menu items but would have minimal knowledge of the underlying GUI code that generates and mages their presentation. This approach allows an application to be run on a remote separate machine and accept GUI messages for the user's machine.

This embodiment exploits this distributed structure to allow the user to send applications messages that may be on a remote system. The messages are related to the user interface (UI) messages in the menus. An application can define a set of instant messaging UI messages (IMUI) specifically to serve IM users. Furthermore, since application management on a desktop UI is similar, the invention allows the user to mimic the capabilities found on a desktop.

The invention exploits the typical features of IM provided by IM services. The invention creates and manages a group of IM identities specifically to serve as proxies for applications. These identities are then added to the Buddy list of actual IM users. Each of these new entities will be referred to as a buddy app (BAPP). Buddy list inclusion allows the BAPP to interact with users. A server, like a window management system, manages the application proxies to make BAPP appear, disappear, change appearance, change status, send messages, accept messages, etc. The server utilizes the IM behavioral model to produce the desired application interface to the IM user.

The real IM user sees a set of IM identities including the BAPPs that represent applications. The server is responsible for the presentation of applications' related IM identities. The server determines which identities should be presented to a user and the appearance. The message exchanges between IM user and the Bapp result in changes in the application buddies.

In a further embodiment of the invention, there is a special buddy to be available that acts like the Main BAPP. One can imagine it similar to a shell or command program, a program to launch other programs and manage files. By sending the main BAPP messages, the user can request applications, file operations, or services and receive appropriate responses. After an application is spawned, its BAPPs (one or more) are displayed as an IM buddy. The user can send messages to the application via the BAPPs. For example, (assuming the classic drop menu application scheme) by sending a "new" message to the "File" BAPP the user can create a new application document. The application sends a message response via the BAPP; the user can edit the message and send the modified text back to the application or issue a new message.

BRIEF DESCRIPTION OF THE DRAWINGS

Various embodiments of the present invention will now be described in detail in conjunction with the annexed drawings, in which.

DETAILED DESCRIPTION

In an embodiment of the invention an IMUI (Instant Messaging User Interface) system is provided for mapping GUI-based applications onto a canonical IM client. The system produces a direct transformation of an application GUI to an IM user interface model with minimal functional deviations. Even important productivity features such as macros and keyboard shortcuts are transferred into the IM realm. In this embodiment IMUI does not replace the application usage model with yet another, instead, it leverages user knowledge and expertise by retaining the GUI elements and behavior within a messaging format. The same application is used but is essentially obtained from chat sessions in an IM client.

This invention is particularly applicable to a user who alternates, as needed, between desktop application usage and a more limited experience on a mobile device. If this user were seated in his office, then the desktop computer is likely the best platform for using his favorite applications. If the scenario parameters change in any way, then IMUI is a compelling alternative. By way of example, should the user walk next door to a colleague's office, applications may no longer be accessible or may require reconfiguration (i.e., file accessibility, work state, licensing, etc). Should the user leave the building, more challenges arise, like an absence of computers and network access.

Figure 1:
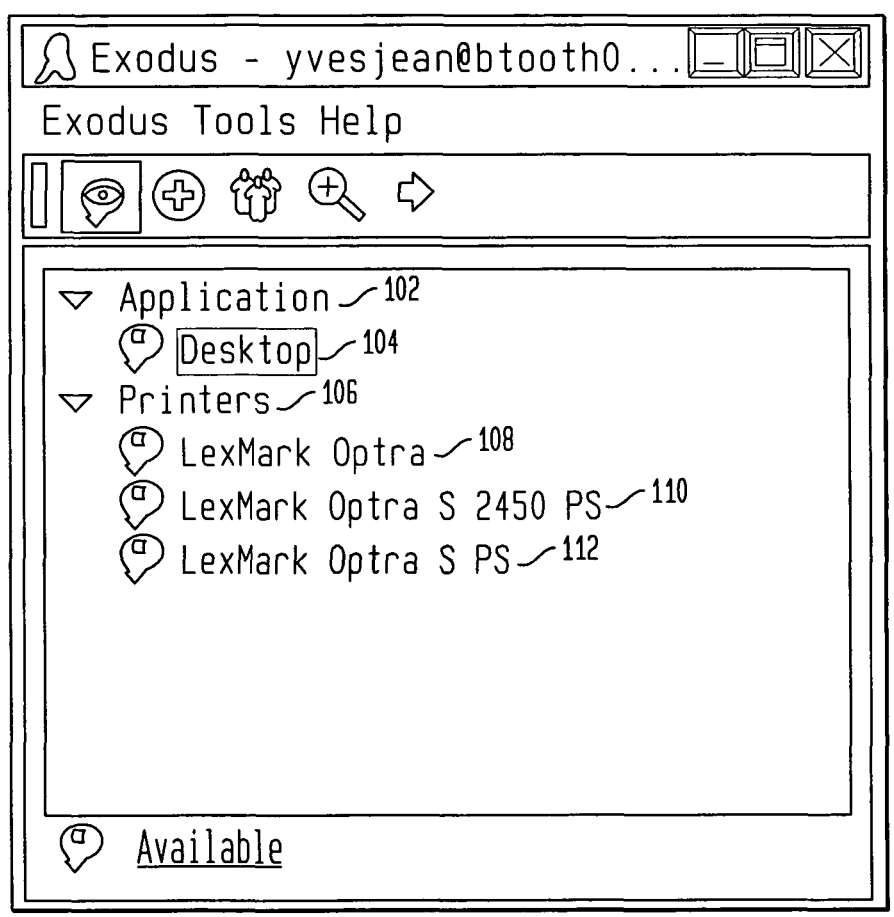
FIG. 1 illustrates an example of the IMUI of the present invention using JABBER wherein the depicted buddies represent Desktop and three available printers.
Figure 2:
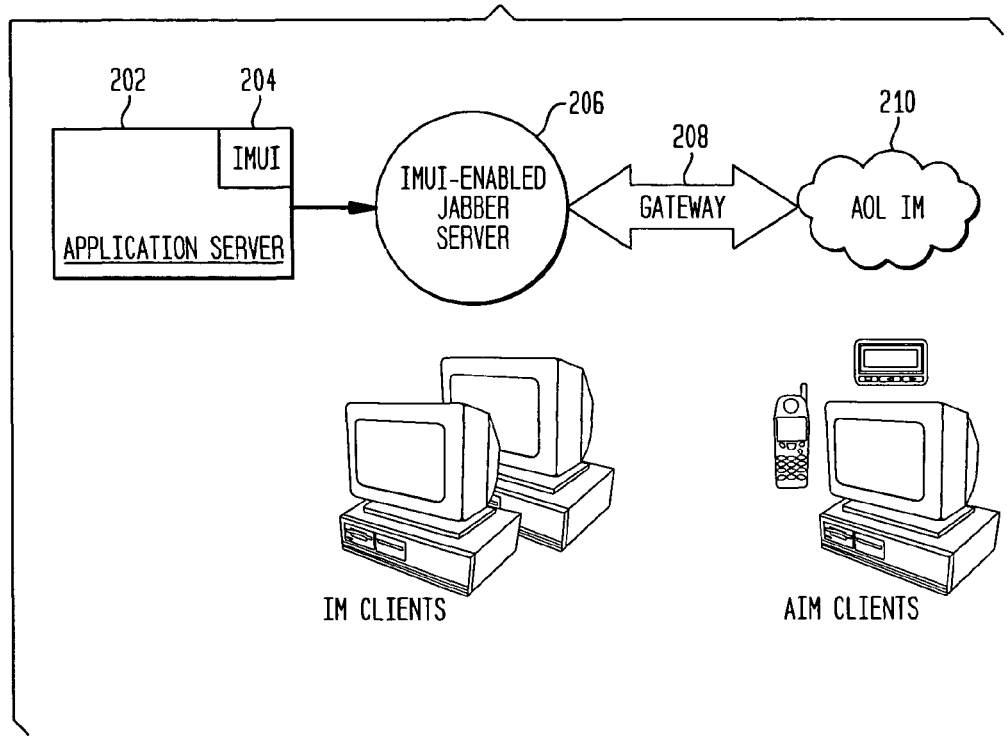
FIG. 2 illustrates an embodiment of the invention when used with a standard IM client, such as AOL IM.

FIGS. 1 and 2, illustrate how IMUI 204 provides access to applications via the IM client of any well-known messaging system such as JABBER. Such a messaging system is employed over gateways 208, to service providers such as AOL IM (illustrated as item 210), ICQ, Yahoo IM, MSN, etc. The embodiment of the invention depicted in FIG. 2 illustrates the IMUI components distributed across an enhanced JABBER server 206 and a J2EE application server 202. By building upon widely available IM services and middleware standards this embodiment functions independent of network transport.

I. The IMUI User Interface Management Model

In one embodiment of the invention, IMUI maps application GUI elements such as menus and text boxes to automated IM identities. The system controls a pool of synthetic IM users (SIMU) or dynamically registers new user identities as necessary to provide service. IMUI logs SIMUs in or out of the IM server and configures the buddy associations. All messages to SIMUs are consumed by IMUI and routed to the appropriate application. IMUI accepts from (real) users messages formatted to reference an application GUI element. FIG. 1 is an example of such a message that shows a simple IMUI session in a JABBER client. As illustrated, the buddy list represents applications 102 and resources such as Desktop 104 and printers 106. IMUI allows users to have a choice in how an application is represented in an IM client. As illustrated, top-level menus can be mapped to buddy groups (e.g. "Printers" 106) while submenu items 108, 110, 112 are mapped to the group members. Another option is to represent an application user interface with a single IM identity. The difference between the two options appears in the length of the GUI message. A shorter message is used when a message is sent to a submenu buddy because there is less need for disambiguation. For example, to open a file in a single buddy application the user may send the message "file open 'filename'." In an application with a buddy group per top-level menu the user may send the message "open 'filename'" to the File buddy.

A. UI Management

The buddy name displayed on a user's IM client is either the unique IM handle or a nickname chosen by the user. This common IM feature allows a user to assign a nickname to replace the sometimes-cryptic unique handle. The nickname is strictly aesthetic; it can be changed at any time. Buddy lists are normally stored on the IM server for retrieval when the user logs in from an IM client. IMUI leverages this server scheme to automate the process of dynamic buddy list naming.

Logging SIMUs in and out of an IM server is not sufficient for rendering a user interface on a canonical IM client. In the IMUI system of this embodiment of the invention, a SIMU has three attributes. In addition to the unique IM handle, it has an association list, and a name (technically a nickname).

IMUI changes the SIMU nickname in a user's buddy list to correspond to a resource or application. By renaming a SIMU, IMUI can change an application's appearance on the IM client. This is useful when it is appropriate to display application or resource state information. For example, a telnet application may originally have a buddy name 'telnet' but later include the host name.

An association list is the set of users that include a given SIMU in their buddy list.

This parameter allows a SIMU to be a reusable, pooled resource. A SIMU can be obtained from the pool and assigned to a user by changing the buddy lists of both the SIMU and the user. The SIMU is returned to the pool after the user terminates the application (SIMU) or logs out. The freed SIMU can be reused for another IMUI purpose.

In an additional embodiment of the invention, the IMUI has buddy list editing capability for all users, both real and synthetic. In this case, the IM server supports server-side buddy list changes. By way of example the IMUI may use a modified JABBER server that features an interface for roster (buddy list) management.

B. The Überbuddy

Figure 3:
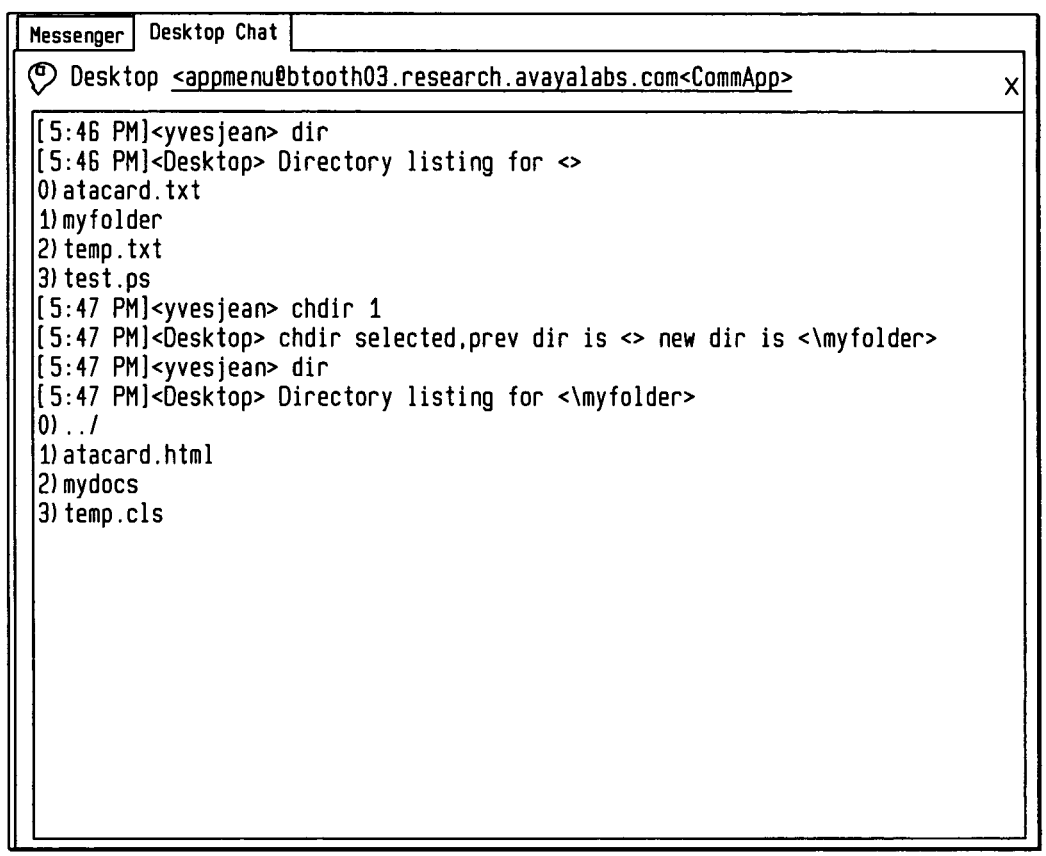
FIG. 3 is illustrates an embodiment of the invention in which chat with Desktop buddy is employed to issue directory commands.

In an additional embodiment of the invention the IMUI defines a single, system-wide IM buddy, an "Überbuddy," that is logged in at all times and captures user presence information for the system. The information is used by the IMUI to provide presence-driven service to the user. In this embodiment the Überbuddy is normally named "Desktop" in buddy lists because it also accepts service request messages from users. The Desktop buddy provides basic file and printer services and allows user applications to be spawned. By way of example, FIG. 3 illustrates this embodiment of the invention in which an IMUI chat with the Desktop buddy is employed to issue directory commands. Desktop is analogous to an operating system shell prompt like MSDOS and BASH. In additional embodiments, users may have applications pre-deployed on their IM client or launched based on a context-driven algorithm.

C. Minimalist Desktop

In an embodiment of the invention, the services of the Desktop buddy and other IMUI applications are referred to herein as the "Minimalist Desktop." This name reflects an attempt by this embodiment of the invention to project a desktop PC application and resource model to IM users. That is, the IMUI design goal is to provide the choices and functionality of a desktop environment but on mobile devices. The Desktop buddy is typically accompanied with File and Printer groups. These two resources are user and context dependent. IMUI provides small-footprint servers for distributed file and printer access. Each server is user configured to expose local files systems and printer resources to the main IMUI server. IMUI can then provide access to these resources to the user over an IM client. The Desktop and resource buddies also share session context to streamline basic file and printer operations. For example, a user may perform a directory operation with either the Desktop buddy or the File buddy. Assuming the file listing was performed with Desktop and the user wishes to print the second file in the directory with the first printer buddy, the user may issue the print command through Desktop only using indices for the file and printer choices. This is possible because Desktop, the Überbuddy, is aware of the file listing order and the printer buddy order.

Desktop is the only native IMUI application. All other applications are external and integrated into the IMUI system. Currently, context sharing is limited to the Desktop, File, and Printer buddies. Further discussion of the Desktop buddy and the underlying IMUI infrastructure is found below.

II. GUI-Emulating API

The chat window of an IM client is a natural interface to applications with text-based terminal user interfaces. Difficulty arises when one considers the various classes of graphical user interfaces used by web and desktop applications. Menus, buttons, entry boxes, selection lists, etc., are part of the normal palette of interface elements in GUI applications. A user manipulates these GUI elements with text input, mouse clicks, dragging, etc. The activity is sent to the application, which interprets the element choice and user action. To support these applications in a messaging user interface model (IM chat), a transformation of the GUI elements to an IM paradigm-compatible form needs to be defined.

In an embodiment of the invention the IMUI accepts GUI manipulation expressions from an IM user to manipulate applications. Therefore, the system must capture application GUI design specifications to render on IM clients and for message parsing. Applications are controlled at the Application Program Interface (API) level, requiring IMUI to also incorporate application programming interface information. Therefore, each application has a particular GUI and API specification.

An embodiment of the invention will now be described which relates to the complementary GUI and API specifications in IMUI and the invention's methods for utilizing the information. In particular, this description will contain the general approach to GUI design capture and the available sources of design specification information.

A. GUI Design Capture

Contemporary computer systems and software development tools help programmers reduce the complexity of their applications by providing an independent server for GUI management. Systems such as X Windows Protocol and Microsoft Windows provide libraries for defining a GUI and managing user manipulation of the interface. The application programmer need only supply instructions for handling messages representing user activity and GUI state information.

Many development tools allow user interface design and viewing before any application code is written. The specification for the design is stored in a text file and processed by the development system for linkage with the application code. For example, a developer using the Microsoft Windows development environment can use the Microsoft Visual tools to design the user interface and save the description in a text resource file (*.rc file). Another example is Tcl/TK, a popular system and development environment, originally from the UNIX world, which also supports GUI applications. Tcl/TK is script-based so it naturally keeps user interface layout information in a script file (*.tcl file). In both examples the GUI specification can be kept in a text file separate from the application code.

B. Application Domain APIs

Application server component architectures such as J2EE and Microsoft's .NET contain a collection of technologies exposed through APIs (including protocols and services). Each API represents a domain of applications that can be invoked by the application server. However, each application defines a unique set of commands for application operation. For example, one API available on some application servers is COM. This API covers many Microsoft Windows applications. An application accessible over COM, such as Microsoft Excel, defines a set of application-specific commands. To load a spreadsheet, or perform any other operation possible from the Excel user interface, a script of Excel COM API calls can be generated to produce the desired behavior.

There are many other APIs, protocols, and programming abstractions available for application integration. Additional examples of APIs and their application domains include HTTP (Web), EJB (J2EE), SOAP (Web Services), SQL (Database), etc. In an embodiment of the invention IMUI's application server component is built upon the Weblogic application server (developed by BEA Systems, Inc., and hereby included by reference). This server supports many of the previously mentioned APIs. The set of APIs supported on the IMUI system determine the space of application domains available to users on their IM clients.

In additional embodiments of the invention the IMUI also incorporates the telnet protocol to extend the application server native API set. Telnet enables access to the large set of shell or command-line applications. Also, the terminal interface is naturally matched to the IM chat mechanism.

C. GUI-API Symmetry

An application model (user model) can be defined as the GUI or the front-end. The API or back-end is for developers and may be subject to different design goals. Depending on the functional symmetry between an application's API and GUI, a complete substitution of the GUI by an application server manipulating the API is possible. Due to this symmetry one embodiment of the invention creates a back-end application model that emulates the GUI. In fact, the model may be expressed simply with scripts of API calls that emulate GUI commands. If a script-level implementation is not sufficient the native programming tools of the application server can be used.

In IMUI the application GUI specification is captured by parsing the GUI text resource file using the development environment's grammar. The parsed specification can be converted into a software representation (e.g., Enterprise Java-Beans (EJB)) or a XML description or some combination of the two. For each GUI element a set of API instructions is generated to emulate user manipulation. To support a range of UI elements, naming and state variables are introduced.

The following are some examples of GUI elements and corresponding backend approaches to emulation in a messaging environment:

Commands (menu, button): one or more API calls to emulate a menu selection or button depress.
  Text Input (entry box): named variables are created for these interface elements commonly used in forms.
  State selection (drop list, radio button, check box): named variables are created with values constrained to the selection choices.

Some additional application interface issues are address below:

Object selection (point or region): a dynamic list of named objects is maintained to invoke API calls upon selection.
  Output from the application is returned from API calls and can be stored in state variables or sent to the user as a response message.

The GUI specification also holds common labor saving application UI features such as keyboard shortcuts and macros. By including macros and keyboard shortcuts IMUI retains most of the user interface options. More importantly, keyboard shortcuts and macros are text-based UI features compatible with the IM paradigm while also familiar and beneficial to users. Keyboard shortcuts are sometimes the interface of choice for many users and, therefore, may define the user's mental model of an application. Macros are application scripts that perform a series of application steps with a single command. They are potentially the most powerful mechanism in the IMUI system. Application macros streamline the syntactic matching between the IM chat interface and the backend application execution. Also, they can be used from both the GUI and the IM interfaces.

For information elements such as text entry and selection lists the system keeps corresponding state variables. They become part of the parameters used in commands when menu items or buttons are emulated.

The GUI/API information can be further utilized to help the user recall the application interface. In an embodiment of the invention illustrated in FIG. 4, the depicted APP Server 402 comprises an IMUI Query System 408, a command review system analogous to the "help" feature of UNIX shells, thereby allowing the user to review the message syntax and features of an application interface. Users can refresh their application usage knowledge without needing keen recall of GUI commands and format. This system reduces the mental burden on the user when using a variety of applications via IM.

Figure 4:
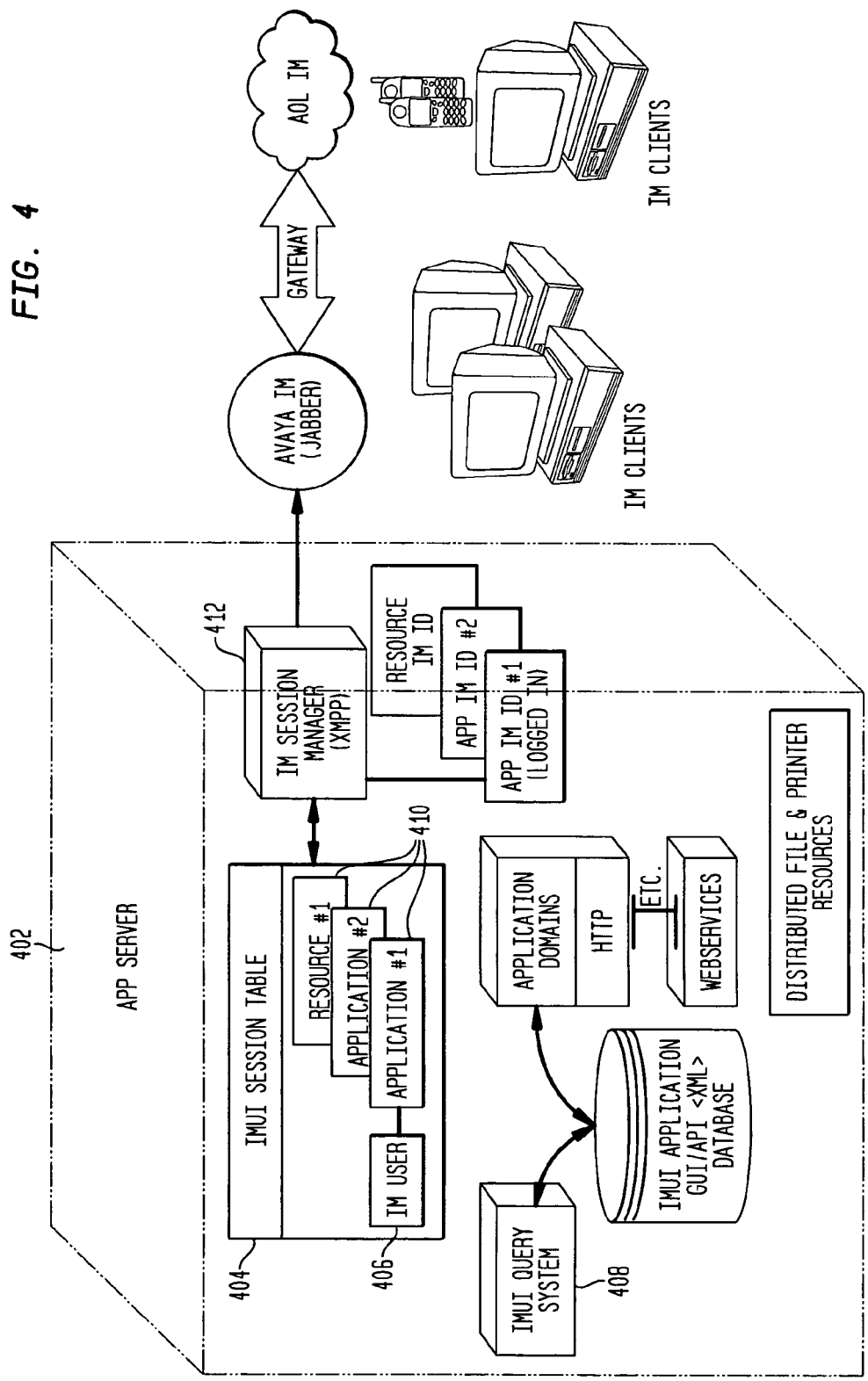
FIG. 4 illustrates IMUI modules in the App Server in an embodiment of the invention; and, FIG. 5 illustrates an embodiment of the invention utilizing IMUI with an MSExcel spreadsheet.

Also depicted in FIG. 4 is the IMUI Session Table 404 which keeps tracks of who the user 406 is and what applications/resources 410 are active/available/open. The IM session manager 412 sends the appropriate commands related to a buddy to the associated application/resources. An example of such a command related to an Excel spreadsheet is illustrated in FIG. 5.

Figure 5:
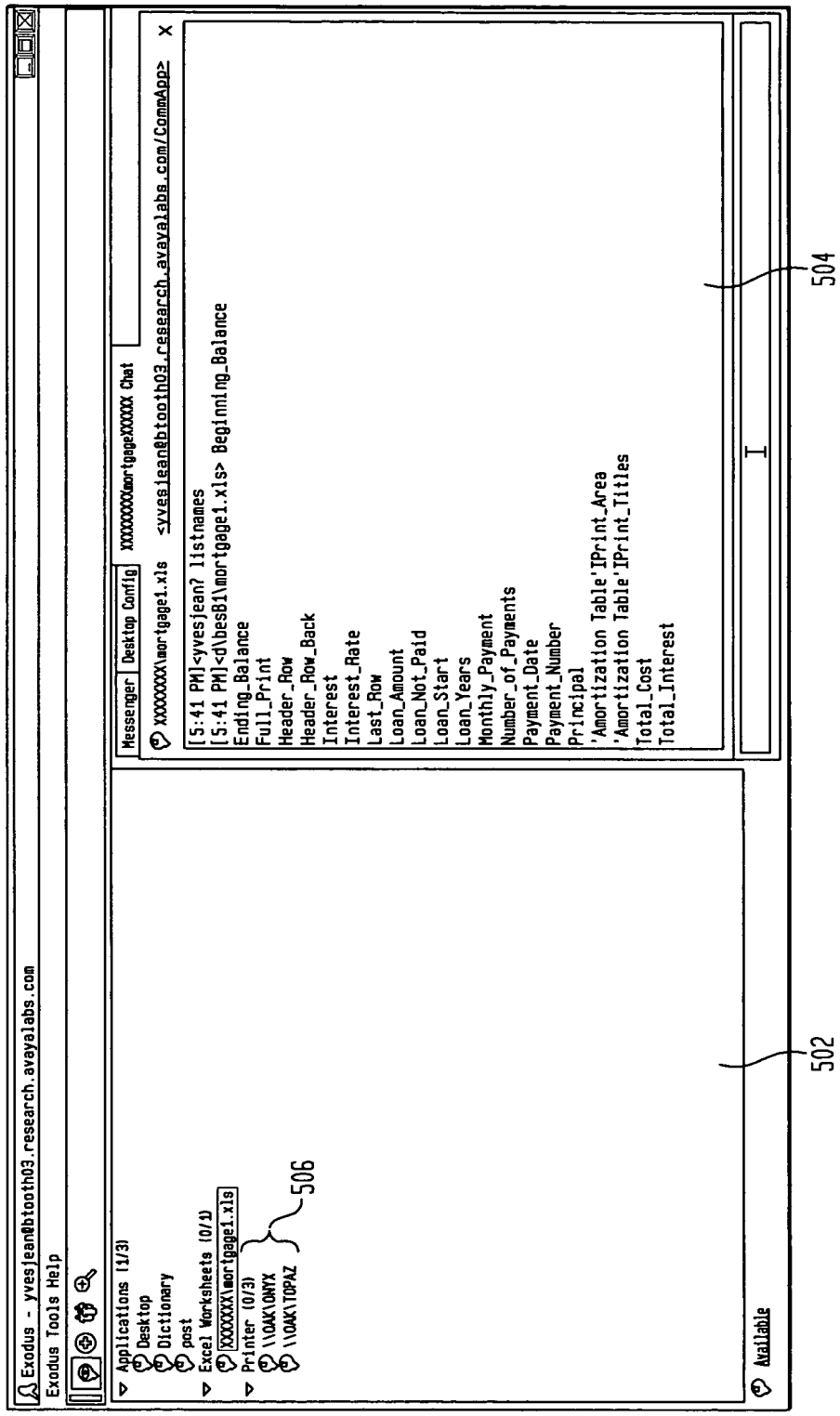

In FIG. 5 the left window 502 depicts a buddy list displayed with this embodiment of the invention. In the illustrated example, an Excel program is running d:\bea81\mortgage.xls. The right window 504 shows the IM "chat" with "d:\bea81\mortgage.xls" that is invoked when the appropriate entry on the buddy list is selected. In this example a List-Names Excel command is issued to the Excel program. This command results in a listing of all non-hidden names defined on the worksheet which appears in the right window 504.

III. IMUI Framework Design and Implementation

The framework design of an embodiment of the present invention will now be discussed. The main goal of this design is to enable the integration of a wide class of applications for access via IM. Other priorities include the wise use of resources to maximize request throughput.

The three components of this embodiment, as illustrated in FIG. 4, include the enhanced JABBER server, the IMUI Session Manager gateway and the IMUI system application server components. The client software is not included because the system is designed for use with an unmodified client.

A. Enhanced JABBER Server

In the depicted embodiment the messaging server is built upon the open source jabberd server. The jabberd server uses the Extensible Messaging and Presence Protocol (XMPP) and provides a gateway to AOL and other IM systems. Currently available clients include Exodus and, via gateways, the AOL, MSN, and Yahoo IM clients.

The server has been extended to include a pool of IM accounts for receiving messages from users destined for applications. These accounts are SIMUs, the IMUI buddies deployed to represent applications to IM users. The server also supports dynamic roster changes for both SIMUs and real user accounts. These administrative extensions enable the dynamic naming and associations necessary for UI management on an unmodified client. A privileged external entity (IMUI) is allowed to make these roster and SIMU changes.

B. IMUI Session Manager Gateway

The IMUI Session Manager gateway is separate from the enhanced JABBER server to isolate the general IM client traffic from the IMUI system traffic. Instant messaging is inherently stateless which means that messages have no access to the conversation history. Messaging servers are efficient traffic handlers because they are free of history or state. However, IMUI must handle state information to manage the UI rendering and application state. The gateway is bracketed by messages from the enhanced JABBER server and the application responses and administrative commands from the IMUI system. These are two distinct message traffic patterns requiring different implementation strategies. The gateway converts the XMPP messages for the IMUI system and sends the results via JMS. The IMUI system issues commands to the gateway to manage SIMUs and to shuttle messages between applications and users.

C. IMUI System

In this embodiment of the invention the IMUI system must monitor the presence of registered users, create application buddies as needed, and facilitate access to the backend application resources. Again, it should be noted that the messaging server could have been augmented to handle the IMUI functionality but since messaging servers are not designed to handle state or perform functions such as load balancing, resource pooling, and stateful transactions, these features would need to be created. Therefore, the system was implemented using BEA Weblogic, a J2EE compliant application server. Some of the highly utilized Weblogic services include message queues, database pooling, Microsoft COM access, servlets, and EJBs.

When a user logs into the messaging server, IMUI creates a user session object that stores key value pairs that represent application defaults, buddy mappings and current transaction information. The user state information is found each time a message is received by looking up the IM handle of the user sending the message. Each user key and value set is stored as a row in a database and is accessed via entity EJBs. State replication is avoided since many buddies can access the user state simultaneously without major coherency problems.

The buddy abstraction serves to manage access to applications based on the incoming message. Conversations can take place across multiple messages by providing stateful application resources that are managed for the user. Messages to the user can be produced independent of an initial user request by the asynchronous message handling subsystem.

1. The Buddy System

Each buddy that appears on an IMUI screen is an actual IM handle that has been renamed (nicknamed) to represent an application. The Überbuddy receives presence notifications from the server and messages from users requesting service from the IMUI system. It is "aware" of the existence of the other buddies because it is part of the session management system. It manages the user's session until the user logs out, causing the acquisition and release of SIMUs as needed.

User initiated messages are routed to the appropriate buddy application object based on the target of the incoming message. The IM handle of the message recipient is used to look up the target buddy in the user session record. The target buddy object is retrieved to service the request. The buddy parses the incoming text message and invokes the appropriate backend process to handle the user request. The backend process handles application specific data.

In addition to the Überbuddy, there are four other types of buddies:

Stateless synchronous—responses are synchronous, shared application resources

Stateful synchronous—responses are synchronous, dedicated application resources

Stateless asynchronous—not user-initiated; asynchronous messages from backend processes, shared application resources Stateful asynchronous—not user-initiated; asynchronous messages from backend processes, dedicated application resources Stateless synchronous applications only send responses to user requests. This buddy can be shared between users since the application does not need to keep invocation specific information between messages. Any framework related defaults or administrative data is stored and maintained by the session manager.

Stateful synchronous applications send responses to user requests but the application instance needs users specific information and, therefore, cannot be shared between users. An example would be access to an Excel spreadsheet. When the buddy is created, it represents a specific spreadsheet that is accessible by a single user. As depicted in FIG. 5 the spreadsheet is opened and is dedicated to the session of the user.

Asynchronous message handlers are created for a specific user and buddy. The telnet buddy (terminal emulation to host machines) is an example of an application that needs asynchronous services. Such services watch for requests to return messages (i.e. a command line prompt) and map the messages back to the IMUI buddy that should display the message to the user. Although the telnet session's output is in response to a user request, there is no time limit on when replies might be received. Another example would be a buddy set up to send notifications of voicemail messages. The voicemail listener is an asynchronous service to send messages back to the user as necessary.

2. Proprietary IM Modifications

Some proprietary messaging systems do not facilitate the creation and change of user accounts programmatically. Therefore, the IM client-rendering model has been modified to allow all application access via a single Desktop buddy. In a single buddy interface all messages are sent through one chat window. Message destination is based on a "default" application context. To change the default application for receiving messages (i.e. change the target application from telnet to a printer), an additional set of commands are introduced. These commands allow the user to switch context from one application to another. The available applications can be listed as well to keep the user informed. The single buddy interface is also necessary when using limited IM clients such as pagers or wireless phones with limited text displays.

3. Resource Access Wrappers

Application resources exist on a variety of platforms and languages. Access to such resources is accomplished via wrappers that encode protocol and functionality information. By way of examples, IMUI applications may include Excel via COM; Dictionary.com via HTTP; SSH (secure telnet), file access and printer access via Remote Method Invocation (RMI); and directory access via Lightweight Directory Access Protocol (LDAP).

4. Resource Servers

Files and printers are location dependent resources. An enterprise may be composed of multiple physical locations sharing a common network. Printers in such an enterprise perform the same function yet are distinguished by physical location (and capabilities), both within a site and across facilities. A user may move about the various sites and need to print documents to the nearest printer. In an additional embodiment of the invention the IMUI utilizes printer servers, e.g., small footprint servers running the Java Print Service. Such printer servers perform service discovery and are distributed to map enterprise printers to their physical locations.

Similarly, users may access more than one file system. In addition to a home directory on a network file system a user may utilize files on their PC's. Other directories on networked machines may be of value to the user (i.e. shared project directories). IMUI uses local file servers to support retrieval of such files for the user via IMUI.

IMUI combines file and printer servers to allow a user to print their various files to the various printers. The servers are sent the print requests and handle the file transport outside of the IMUI server.

IV. Prototype Examples

As noted above, the "Minimalist Desktop" concept of the present inventions seeks to provide applications and resources commonly found on a desktop environment to IM users. In plain language, it is a recreation of a productive office application palette in the most diminutive package and enhanced by presence information. The expectation is that this new technology configuration will alter mobile application usage behavior. IMUI is designed to deliver applications beyond information query and access. The native GUI support allows the system to span application classes like Microsoft Office, the web, web services, etc.

In various embodiments of the invention IMUI provides the technological service of access and control of applications and information normally physically anchored in an office. The combination of access and usage of applications should lead to new usage behaviors and scenarios. For example, Excel spreadsheets, once built, hold financial models and information that can be useful even without display of the full worksheet. As illustrated in FIG. 5, an Excel application buddy is loaded with a mortgage spreadsheet model. The user chats with the buddy to list all named cells in the mortgage model. The user can get/set those cells to values of interest and the spreadsheet is updated automatically (as expected). The user can then display a named cell, range of cells, or a region in the chat window. The user can also print or email the spreadsheet or a chart by executing a named macro. It is anticipated that IMUI users will change their spreadsheet designs to include more macros for common tasks and procedures. The motivation will in part be due to facilitating productivity in IMUI scenarios.

Presence information can be used to enhance any IMUI scenario. FIG. 5 shows the set of printers 506 selected by the Uberbuddy for the user upon presence detection. The set of printers could have been based on the user's location (possibly derived from the presence information). Of course, the user can add and remove printers as desired. For instance, the user may request a remote printer at a commercial document printer. Ideally, traveling to deliver a presentation could only require taking along a mobile phone with IM service and stopping by a local printing establishment near the destination.

Presence notification can also be used to provide the user with an indication of application state. A package-tracking buddy can perform the polling of package tracking websites and change presence state upon arrival of the package. An office phone buddy can indicate the ringing of the office phone whenever the user is out of audible range. The user might even wish to choose different answering options based on the caller id. For example, choosing a "just a minute I'm down the hall" message to keep the caller from hanging up.

The ability of the present invention to map an array of various IMUI specific visual icons to better reflect the state of various applications and/or resources is not limited to the above examples. The well-known IM ability to map different icons with buddies can be utilized in this invention in numerous ways. By way of example, the invention enables an individual to select an icon representing his mood to indicate his "state" for receiving phone calls. Use of animated icons, as are well-known in IM messaging, are also contemplated by the invention.

The telnet buddy can be seen as both an application and an application class. By providing access to shell-based applications on remote hosts, it delivers a class of applications to the user.

IMUI broadens the utility of telnet by facilitating sharing of telnet sessions. The IMUI session manager can allow users to share or swap telnet sessions by sending a request to the Desktop buddy. A useful application of this feature is remote technician access to networked systems. For example, a communications device on a network may need servicing by a technician. The technician may only need command line access to the device to issue commands, run scripts, etc. The customer need only log onto the network and transfer the session to the technician to initiate the repair operation. In sharing telnet sessions it would be rational to add message filtering to restrict certain messages from a telnet session borrower (i.e. password changes). If access to IMUI is allowed from unsecured external IM systems then it is recommended that the telnet buddy be restricted to hosts within a computer network demilitarized zone (DMZ).

IMUI is also useful in requests for graphical display service. A telnet session can be used to configure X-Windows for a local display. Since many corporate network access rules allow for outgoing connections it is possible to display an enterprise X-Windows application on an external machine.

Of course, other application buddies can be shared. A possible out growth of this sharing option is "application operators." Similar to telephone operators, application operators are contacted to request applications on demand. This situation is likely during mobile device usage in a public environment. A customer might request a partially filtered list of airline flight times from a travel website. Once the application is transferred the customer can leisurely analyze and prune the list to serve their particular travel and budget needs.

V. Additional Features

Inherent in the current invention are the features that relate to built-in facilities in the application server and in the messaging server. Accordingly, access to IMUI via IM gateways is insecure using the popular free services. The invention contemplates attaining enhanced security by utilizing enterprise versions of these services. Additional embodiments of the invention further address issues of security within the architecture of IMUI. Building security and authentication features into IMUI are addressed in these embodiments.

Further embodiments of the invention include adding new application classes to IMUI. For example, supporting X-Windows applications within IMUI is useful because it allows users to benefit from the large software base. Not all applications can be used. For example, Xclock is a highly unlikely candidate for incorporation into IMUI.

While the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. A method for enabling a user logged in to an Instant Message (IM) network to utilize the IM infrastructure to access network resources, said IM infrastructure comprising a buddy list displayed to the user and an instant messaging server; said method comprising the steps of:
    mapping at least one menu element of a graphical user interface (GUI) of at least one of the network resources to an IM identity;
    displaying the IM identity as an entry on the buddy list; and,
    permitting the user access to said at least one network resource via said at least one menu element of the GUI by IM communication with the displayed IM identity through the IM infrastructure.

2. The method of claim 1 wherein said displaying step comprises providing the user with availability information relating to the at least one network resource.

3. The method of claim 1 wherein said displaying step comprises providing the user with state information relating to the at least one network resource.

4. The method of claim 1 wherein said network resources are selected from the group consisting of applications, objects, hardware devices, and data files.

5. The method of claim 1 further comprising the step of managing which of said at least one IM identities are to be displayed on the buddy list.

6. The method of claim 5 in which said managing step comprises the step of determining the availability of the network resource.

7. The method of claim 5 in which said managing step comprises the step of ascertaining the state of the network resource.

8. The method of claim 5 in which said managing step comprises the step of responding to one or more IM communications by the user.

9. The method of claim 8 further comprising the step of pairing two or more resources together by mapping them to a single IM entity.

10. The method of claim 1 further comprising the steps of:
    controlling a pool of synthetic IM users (SIMU), each of said SIMUs comprising an IM handle, an association list, and a nickname; and,
    determining the entry to be displayed based upon said IM handle or said nickname.

11. The method of claim 10 further comprising the step of representing specific functionality of a network device as a SIMU.

12. The method of claim 1 further comprising representing said entry on the buddy list as an application graphical user interface (GUI) element.

13. A system for enabling a user logged in to an Instant Message (IM) network to utilize the IM infrastructure to access network resources, said IM infrastructure comprising a buddy list displayed to the user; said system comprising:
    an instant messaging server configured to receive instant messaging from users destined for applications and general IM client traffic;
    an instant message user interface gateway configured to isolate general IM client traffic from messages between applications and users;
    an application server, wherein the instant messaging server and the application server are configured to collectively map at least one menu element of a graphical user interface (GUI) of at least one of the network resources to an IM identity; to display the IM identity as an entry on the buddy list; and, to permit the user access to said at least one network resource via said at least one menu element of the GUI by IM communication with the displayed IM identity.

14. The system of claim 13 wherein the application server is configured to provide the user with availability information relating to the at least one network resource.

15. The system of claim 13 wherein the application server is configured to provide the user with state information relating to the at least one network resource.

16. The system of claim 13 wherein said network resources are selected from the group consisting of applications, objects, hardware devices, and data files.

17. The system of claim 13 wherein the application server is configured to manage which of said at least one IM identities are to be displayed on the buddy list.

18. The system of claim 17 in which said application server is configured to determine the availability of the network resource.

19. The system of claim 17 in which said application server is configured to ascertain the state of the network resource.

20. The system of claim 17 in which said application server is configured to respond to one or more IM communications by the user.

21. The system of claim 20 wherein the application server is configured to pair two or more resources together by mapping them to a single IM entity.

22. The system of claim 17 wherein the application server is configured to control a pool of synthetic IM users (SIMU), each of said SIMUs comprising an IM handle, an association list, and a nickname; and, to determine the entry to be displayed based upon said IM handle or said nickname.

23. The system of claim 22 wherein the application server and the IM infrastructure are configured to collectively represent specific functionality of a network device as a SIMU.

24. The system of claim 13 wherein the application server is configured to represent said entry on the buddy list as an application graphical user interface (GUI) element.

25. The method of claim 1, wherein the network resources include shared application resources and dedicated application resources each accessible by IM communication with the displayed IM identity through the IM infrastructure.

26. The system of claim 13, wherein the network resources include shared application resources and dedicated application resources each accessible by IM communication with the displayed IM identity through the IM infrastructure.

27. A method for enabling a user logged in to an Instant Message (IM) network to utilize the IM infrastructure to access network resources, said IM infrastructure comprising a buddy list displayed to the user and an instant messaging server; said method comprising the steps of:
   mapping a plurality of IM identities to a hierarchy of graphical user interface (GUI) elements of a network resource;
   displaying a hierarchical arrangement of IM identities on the buddy list; and
   accessing at least one of the GUI elements of the network resource by IM communication with one of the plurality of displayed IM identities through the IM infrastructure.

28. The method of claim 27 wherein said step of displaying a hierarchical arrangement of IM identities on the buddy list comprises displaying an IM identity of a first GUI element at a first level of the hierarchical arrangement, IM communicating with the first GUI element, and in response to the IM communicating with the first GUI element, displaying at least one additional IM identity of a GUI element from a level beneath the first GUI element in the hierarchical arrangement.

29. A system for enabling a user logged in to an Instant Message (IM) network to utilize the IM infrastructure to access network resources, said IM infrastructure comprising a buddy list displayed to the user; said system comprising:
   an instant messaging server configured to receive instant messaging from users destined for applications and general IM client traffic;
   an instant message user interface gateway configured to isolate general IM client traffic from messages between applications and users; and
   an application server, wherein the instant messaging server and the application server are configured to collectively map a plurality of IM identities to a hierarchy of graphical user interface (GUI) elements of a network resource; to display a hierarchical arrangement of IM identities on the buddy list; and to allow access at least one of the GUI elements of the network resource by IM communication with one of the plurality of displayed IM identities through the IM infrastructure.

30. A method for enabling a user logged in to an Instant Message (IM) network to utilize the IM infrastructure to access network resources, said IM infrastructure comprising a buddy list displayed to the user and an instant messaging server; said method comprising the steps of:
   mapping at least one icon of a graphical user interface (GUI) of at least one of the network resources to an IM identity;
   displaying the IM identity as an entry on the buddy list; and,
   permitting the user access to said at least one network resource via said at least one icon of the GUI by IM communication with the displayed IM identity through the IM infrastructure.

31. A system for enabling a user logged in to an Instant Message (IM) network to utilize the IM infrastructure to access network resources, said IM infrastructure comprising a buddy list displayed to the user; said system comprising:
   an instant messaging server configured to receive instant messaging from users destined for applications and general IM client traffic;
   an instant message user interface gateway configured to isolate general IM client traffic from messages between applications and users; and
   an application server, wherein the instant messaging server and the application server are configured to collectively map at least one icon of a graphical user interface (GUI) of at least one of the network resources to an IM identity; to display the IM identity as an entry on the buddy list; and, to permit the user access to said at least one network resource via said at least one icon of the GUI by IM communication with the displayed IM identity.

* * * * *